United States Patent [19]

Edwards

[11] Patent Number: 5,978,431
[45] Date of Patent: Nov. 2, 1999

[54] NUCLEAR FUEL PELLETS

[75] Inventor: John Edwards, Sellafield, United Kingdom

[73] Assignee: British Nuclear Fuels, Risley, United Kingdom

[21] Appl. No.: 09/000,417

[22] PCT Filed: Jul. 26, 1996

[86] PCT No.: PCT/GB96/01828

§ 371 Date: Mar. 30, 1998

§ 102(e) Date: Mar. 30, 1998

[87] PCT Pub. No.: WO97/06535

PCT Pub. Date: Feb. 20, 1997

[30] Foreign Application Priority Data

Aug. 3, 1995 [GB] United Kingdom ................... 9515966

[51] Int. Cl.$^6$ ....................................................... G21C 3/62
[52] U.S. Cl. ........................... 376/261; 376/419; 264/0.5; 252/638
[58] Field of Search ..................... 376/170, 409, 376/411, 419, 901, 260, 261; 264/0.5; 252/636, 638, 640

[56] References Cited

U.S. PATENT DOCUMENTS

| | | | |
|---|---|---|---|
| 3,953,286 | 4/1976 | Watson et al. | 376/409 |
| 4,512,939 | 4/1985 | Dorr et al. | 264/0.5 |
| 4,774,051 | 9/1988 | Peehs et al. | 376/419 |
| 5,642,390 | 6/1997 | Cura et al. | 376/419 |

FOREIGN PATENT DOCUMENTS

| | | |
|---|---|---|
| 0 136 655 A2 | 9/1984 | European Pat. Off. . |
| 277708 | 10/1994 | European Pat. Off. . |
| 61-254887 | 11/1986 | Japan . |
| 62-225993 | 10/1987 | Japan . |
| 64-83188 | 3/1989 | Japan . |
| 2-67991 | 3/1990 | Japan . |
| 3-137596 | 6/1991 | Japan ...................................... 376/419 |
| 1461263 | 1/1976 | United Kingdom . |
| 2 156 144 | 4/1988 | United Kingdom . |

OTHER PUBLICATIONS

Sasagawa et al, "Nuclear Design Method Of Gd–Loaded–MOX Fuel", International Conf., vol. 2, Tokyo, Oct. 1992.
JP 63–293489, Abstract, Nov. 1988.
JP 55–006267, Abstract, Jan. 1980.
JP 4–265896, Abstract, Sep. 1992.
Abstract of Japanese Patent Applicatnion No. JP4265896, dated Sep. 22, 1992, entitled Nuclear Fuel Assembly Light Water Reactor Contain Uranium Plutonium Fission Material Rod Combust Poison.

*Primary Examiner*—Daniel D. Wasil
*Attorney, Agent, or Firm*—Workman, Nydegger & Seeley

[57] ABSTRACT

A method of producing mixed oxide fuel pellets. The method uses oxides of at least two fissile elements and includes a mixing, milling, spheroidising and sintering step to produce a fuel pellet incorporating a neutron poison.

13 Claims, No Drawings

NUCLEAR FUEL PELLETS

The present invention relates to the production of nuclear fuel pellets. In particular, it relates to the production of mixed oxide (MOX) nuclear fuel pellets.

The use of MOX nuclear fuel pellets in pins or rods in fuel assemblies for light water reactors (LWR), eg pressurised water reactors (PWR) and boiling water reactors (BWR) is known, eg as described in Applicants' EP 627,743A. Incorporation of burnable neutron poisons in MOX fuel is unknown. Such poisons have been included as separate fuel rods or incorporated in the fuel pellets of non MOX fuels.

Such poisons allow thermal hot spots to be controlled, especially in mixed reactor cores containing both uranium oxide and mixed oxide fuels. They also allow higher initial fissile isotope enrichments to be used (providing longer fuel cycles and a higher quantity of electricity from the fuel element before discharge from reactor) due to suppression of the initial reactivity. However, such poisons when added directly to the fuel have a deleterious effect on the size of the grains making up the fuel pellets, adversely affecting fission gas retention in the pellets.

Various methods have been described in the prior art for producing fuel pellets in which steps are provided to counteract the effect on grain size of neutron poisons. However, the fuel pellets produced by these known methods do not show ideal properties. The mechanical and physical properties of such pellets may be inadequate, causing for example the pellets to be damaged easily by chips or cracks. The density of the pellet material may vary across the pellet giving a variation in burn up. Such pellets may contain large inhomogeneously dispersed plutonium agglomerates which may lead to several disadvantages including decreased solubility in nitric acid. Consequently treating spent fuel by conventional reprocessing processes is made more difficult.

Addition of the neutron fuel poison directly to the fuel, as opposed to the incorporation of separate rods within the reactor, mean for example that there would no longer be the need for extra production lines for the production of neutron poison rods, it would increase the even fuel burn up and would not require any special assembly design, thus providing a more economic system.

It is an object of the present invention to provide a method for the production of thermal MOX fuel pellets incorporating burnable poison(s) in which the aforementioned problems are reduced or eliminated.

According to the present invention there is provided a method of producing mixed oxide fuel pellets for use in a nuclear reactor, the mixed oxide comprising oxides of at least two fissile elements, the method including the steps of:

(i) providing the mixed oxide with a neutron poison to form a fuel;

(ii) milling the fuel to form a fuel powder;

(iii) treating the milled fuel with a spheroidising step; and (iv) pressing and sintering the fuel resulting from the spheroidising step (iii) to produce a fuel pellet.

Suitable milling, pressing and sintering steps are known per se and are described for example in Applicants' EP 277,708B.

Preferably, the method includes one or more steps to counteract the grain size limiting effect of the neutron poison. Such steps may be known per se.

The method may include addition of one or more additives, prior to the pressing step or these additives may be added at the milling step. The additives are introduced to reduce grain size limitation. Such additives which are known per se include one or more of Ti, Al, Nb, Cr and Mg, eg in a maximum total concentration of typically in the range 0.01 to 1% by weight. Alternatively, or in addition, the method may include control of heating and/or cooling rate at the beginning or end of sintering or a part of the sintering step, and/or the introduction of a small quantity (eg up to 8 percent by volume) of an oxidising gas (eg moisture or carbon dioxide). This oxidising gas is introduced into the gaseous atmosphere employed during the sintering step (normally a reducing atmosphere), eg at specific selected parts of the sintering step when the sintering temperature has been reduced and additionally, for the adoption of sintering temperatures (eg 2000° C.) which are higher than those conventionally used (eg 1600 to 1700° C.) in at least part of the sintering step.

Alternatively, or in addition, grain growth may be promoted by addition of seed crystals to the powder prior to the pressing and sintering steps. This optional step is described in Applicants' EP 416,778A and corresponding U.S. Pat. No. 5,061,434. The seed crystals may be $UO_2$. The seed content may comprise from 1 to 8 percent by weight of the pressed material.

The present invention allows thermal MOX nuclear fuel pellets for use in LWR to be produced having a combination of properties not available in the prior art. Thus, such pellets can incorporate neutron poisons thereby providing longer fuel cycles and higher burn up whilst maintaining satisfactory grain sizes, eg a mean size greater than 10 to 15 $\mu$m. Such fuel pellets also provide enhanced fission product gas retention during fuel irradiation thereby extending fuel burn up. Furthermore, in contrast to the pellets containing neutron poisons made by prior art methods, such pellets can have a uniform density in turn giving uniform and predictable burn up, thus increasing the amount of electricity generated from the fuel element before discharge from the reactor is necessary; good mechanical properties, whereby the possibility of damage during remote handling is significantly reduced; and can be soluble in nitric acid and therefore suitable for treatment by reprocessing (after a suitable time) following irradiation. By control of the sintering process MOX pellets incorporating a neutron poison may be produced having a satisfactory pellet quality, friability, chip resistance, grain size, high and consistent density whilst incorporating the neutron poison.

Preferably, however, approximately 1–3% poison is added which is sufficient to benefit from the above-mentioned advantages. Most preferably, therefore the sintering is carried out at approximately 1650° C. and there being no requirement for two rate ramping to occur in the sintering process.

The pellet density may be controlled by the addition of a pore forming additive, eg the product CONPOR (RTM) supplied by Applicants and described in Applicants' GB 1461263 and corresponding U.S. Pat. No. 3,953,286.

In the method of the present invention, the fissile elements employed to produce the MOX fuel pellets may include uranium and plutonium.

Normally, each of these elements will comprise a mixture of isotopes one of which is fissile. The pellets produced may thus comprise a mixed oxide system comprising uranium oxide and plutonium oxide, the latter comprising for example up to ten percent by weight, and most especially from two percent to six percent by weight, of the mixed system.

The neutron poison included in the mixed oxide system may include any one or more of the known additives, eg one or more of boron and oxides of lanthanides, eg oxides of gadolinium, erbium and other rare earths. Preferably, the total poison additive concentration is in the range 0.5 to 10 percent by weight, particularly 2 to 6 percent by weight, of the overall mixed oxide system. Preferably additives are introduced into the fuel to minimise the reduction in grain size which commonly occurs as a result of the addition of neutron poisons. Problems from bloating and micro-cracking may be overcome by adjusting sintering conditions and/or the introduction of additives.

In the method according to the present invention the milling step is preferably carried out in an attritor mill typically at 100 revolutions per minute for 40 minutes with a ball/charge ratio of 3.5 to 7.5. As in the prior art, a small amount, eg 0.1 by weight, of a solid lubricant such as zinc stearate may be added to the mill before the charge to be milled is added.

In the method according to the present invention, the spheroidising step is preferably carried out using a spheroidiser as claimed in Applicants' EP 331, 311 and corresponding U.S. Pat. No. 4,936,766.

In the method according to the present invention, the pressing step is preferably carried out using a pressure of typically 20 to 30 tons per square inch for a period of 1 to 5 seconds.

According to a further aspect of the present invention there is provided a method of producing for use in fuel for a nuclear reactor pellets comprising a mixed oxide system comprising oxides of at least two fissile elements and an additive which acts as a neutron poison, which method comprises producing a free flowing powder by a binderless process which includes a step of milling a powder comprising a mixture of the oxides of the fissile elements, treating the product of the milling step without any pre-compaction and/or granulation in a spheroidising step, mixing, in an additive mixing the step and sintering the product of the pre-sintering product of the pre-sintering pressing step.

Embodiments of the present invention will now be described by way of example only with reference to the following Examples.

EXAMPLE 1

A powder mixture comprising 96% by weight $UO_2$ formed by the process described in Applicants' GB 2064503B and corresponding U.S. Pat. No. 4,397,824 and 4% by weight $PuO_2$ is produced in a conventional blender. The powder is milled in an attritor mill which has already been run for about one minute with approximately 0.1% by weight zinc stearate lubricant powder before introduction of the $UO_2/PuO_2$ powder.

The product of the milling step is transferred to a spheroidiser of the kind described in Applicants' EP 331, 311B and corresponding U.S. Pat. No. 4,936,766 and treated for a period of around 30 minutes using a paddle speed of approx 20 revolutions per minute.

Neutron poison, such as gadolinia is added to the free flowing powder produced following the spheroidising step to form a mixture in which the gadolinia concentration is about 8 percent by weight. Large grain single crystal $UO_2$ seed crystals made by the method described in the Applicants' EP 416,778A and corresponding U.S. Pat. No. 5,061, 434 are added to the gadolinia containing powder, the seed content being approximately 2 percent by weight. The overall mixture is then pressed at a pressure of approximately 4 Te $cm^{-2}$ in a die to provide a suitable pellet shaped body.

After the body has been through the pressing stage, it undergoes a sintering stage. The sintering is at an atmosphere of about 5 percent by volume $H_2$ in an $H_2$—Ar or $H_2$—$N_2$ atmosphere for 6 to 12 hours at a maximum temperature of from 1650° C. to 1750° C. MOX pellets produced in the above manner may be loaded into cans to form fuel pins under remotely controlled handling operations in the manner described for example in Applicants' EP 627,743.

EXAMPLE 2

The same milling and spheroidising steps are performed as in example 1. However 10 wt % $Gd_2O_3$ is added to a 5 wt % $PuO_2$ and 95 wt % $UO_2$. To avoid the resulting product undergoing bloating and micro-cracking and also to eliminate the very small grain size resulting from the addition of a neutron poison such as gadolinia the sintering conditions and additives required are as follows.

The pressed fuel is sintered by heating it to a temperature of approximately 1000° C. at a rate of 200° C. $hr^{-1}$ and then increasing the temperature to 1650° C. at a rate of 50° C. $hr^{-1}$. This temperature 1650° C. is maintained for approximately four hours, after which the temperature is ramped down to room temperature.

The grain size is increased to 10–15 μm by the addition of aluminosilicates.

EXAMPLE 3

A powder mixture comprising 92 wt % $UO_2$, formed by the process described in Applicants GB2046503 and corresponding U.S. Pat. No. 4,397,824 and 5 wt % $PuO_2$ and 3 wt % $Gd_2O_3$ which are produced in conventional blender are milled together in an attritor mill. The mill is run for 30 minutes at 30 rpm to warm up. The $UO_2$, $PuO_2$ and $Gd_2O_3$ are added whilst the mill is running at 30 rpm for 2 minutes in the following sequence :

½ the $UO_2$ plus 0.1 wt % Zinc stearate plus 0.5 wt % CONPOR;

the $PuO_2$;

the remaining $UO_2$ and the $Gd_2O_3$.

The powder mixture is then milled for a further 22 minutes at 180 rpm before being discharged. The milled powder is then transferred to a spheroidiser of the kind described in Applicants EP331311, where it is conditioned for 25 minutes with an additional 0.1 wt % Zinc stearate. The homogeneous free flowing granules are then pressed into pellets and sintered in a 4%$H_2$:Ar atmosphere for 4 hours at a maximum temperature of 1650° C.

EXAMPLE 4

Pellets are produced in the same manner as in Example 1 or 2 or 3 except that, instead of $UO_2$ seed crystals, particles comprising one or more of Ti, Al, Nb, Cr and Mg are added in a concentration of 0.01% to 1% to the mixed oxide powder prior to the pressing step.

EXAMPLE 5

Pellets are produced in the same manner as in Example 1 or 2 or 3 except that particles of one or more of Ti, Al, Nb, Cr and Mg are added in a concentration of 0.01% to 1%, as well as the $UO_2$ seed crystals, to the mixed oxide powder.

EXAMPLE 6

Pellets are produced in the same manner as in Example 1 or 2 or 3, except that in the sintering step the sintering temperature is at least 1800° C.

EXAMPLE 7

Pellets are produced in the same manner as in Example 1 or 2 or 3, except that in the sintering step the sintering temperature is first at the reduced temperature to 1400° C.–1600° C. with oxidising atmosphere, followed by treatment at a higher temperature, for a period of typically 1–4 hours using a reducing sintering atmosphere of hydrogen/argon.

I claim:

1. A method of producing mixed oxide fuel pellets for use in a nuclear reactor, the mixed oxide comprising oxides of at least two fissile elements, the method including the steps of:
   (i) providing the mixed oxide with a neutron poison to form a fuel;
   (ii) milling the fuel to form a fuel powder;
   (iii) treating the milled fuel with a binderless spheroidising step such that the fuel powder is formed into substantially homogeneous agglomerated granules; and
   (iv) pressing and sintering the fuel resulting from the spheroidising step (iii) to produce a fuel pellet having a continuous homogeneous mixture of the mixed oxide and the neutron poison.

2. A method according to claim 1, in which the fissile elements comprise uranium and plutonium.

3. A method according to claim 1, in which the neutron poison is gadolinia.

4. A method according to claim 1, in which one or more additives are introduced in order to enhance the quality of the fuel pellets.

5. A method according to claim 1, in which the neutron poison is present at between about 0.5 to 10 wt %.

6. A method according to claim 1, in which the neutron poison is present at between 1 to 3 wt %.

7. A method according to claim 1, in which between 20 and 60 wt % of a first fissile element is added, followed by all or substantially all of the second fissile element, followed by the reminder of the first fissile element and the neutron poison.

8. A method according to claim 1, in which the sintering temperature is between 1400 and 1900° C., and preferably between 1650 and 1750° C.

9. A method according to claim 1, in which sintering is conducted in an atmosphere comprising an $H_2$ and inert gas mixture.

10. A method according to claim 1, in which a $H_2$:Ar or $H_2$:$N_2$ atmosphere is used with 5% $H_2$.

11. A method according to claim 1, in which the sintering temperature is reached by increasing the temperature at a rate equal to or less than 200° C./hour.

12. A method according to claim 1, in which the temperature is increased up to 1000° C. at a rate of, or of less than 200° C./hour and the temperature is increased from there to the sintering temperature at a rate of, or of less than 50° C.

13. Fuel produced according to claim 1.

* * * * *